UNITED STATES PATENT OFFICE.

ARMAND MÜLLER-JACOBS, OF NEW YORK, N. Y., ASSIGNOR TO WILLIAM F. WEISS, OF SAME PLACE.

PROCESS OF MANUFACTURING TANNATE OF ZIRCONIUM.

SPECIFICATION forming part of Letters Patent No. 558,197, dated April 14, 1896.

Application filed June 17, 1895. Serial No. 553,113. (No specimens.)

*To all whom it may concern:*

Be it known that I, ARMAND MÜLLER-JACOBS, a citizen of the Swiss Republic, and a resident of New York, county and State of New York, have invented a certain new and useful Method of Manufacturing Tannate of Zirconium, of which the following is a specification.

This invention relates to a chemical compound—viz., tannate of zirconium—and its novelty consists in the method of manufacturing the same.

In carrying out the manufacture of tannate of zirconium I proceed as follows: I dissolve the neutral sulfate of zirconium or any other suitable salt of the same metal in boiling water, so as to obtain a solution of about ten parts, in weight, of the salt in ninety parts of water. To this solution I slowly add small portions of a saturated solution of tannic acid in boiling water until no further precipitate is formed and a slight excess of tannic acid is obtained. The product is then filtered in a filtering-press or in any other suitable manner and the residue is thoroughly washed in boiling water, so as to remove all substances soluble in water. Thereupon the precipitate is dried at a temperature not exceeding 210° Fahrenheit. The product thus obtained is a light yellowish extremely fine powder, and has the following properties: It is insoluble in cold and hot water, alcohol, ether, fatty or aromatic oils, hydrocarbons, &c. It has no taste or odor and is absolutely non-poisonous.

The color of the product is not changed when treated with soluble iron salts, and silver salts are not reduced if brought into contact with it in the dark. It rapidly discolors colored solutions and purifies the same and readily absorbs certain colors and dyestuffs— as, for instance, anilin colors, forming with the same solid pigments of brilliant shades, insoluble in water. These properties make the product valuable in the arts and industry— as, for instance, for filtering, purifying, and discoloring liquids, as water, wine, beer, liquors, &c., and for preventing or retarding the fermentation of such liquids. As a pigment, it may be used for paints, printing-inks, or for printing calicoes, &c.

Another and perhaps more important feature of the tannate of zirconium is its remarkable antiseptic properties, similar to that of iodoform and dermatol, (subgallate of bismuth,) which is caused by its desiccative and absorbing power, its fine division in powder form, and perhaps by the combined action of its constituents—viz., tannic acid and zirconium—both strong astringents in solutions. By reason of these properties it may advantageously take the place of iodoform and dermatol in the antiseptic treatment of wounds and certain diseases.

Having now described my invention, what I claim, and desire to secure by Letters Patent, is—

1. A process of manufacturing tannate of zirconium consisting in precipitating a soluble salt of zirconium with tannic acid in solution, thoroughly washing the precipitate and drying the same, substantially as described.

2. A process of manufacturing tannate of zirconium consisting in the following consecutive steps, first: dissolving a soluble salt of zirconium in boiling water, second: slowly adding thereto a saturated solution of tannic acid in boiling water, third: filtering the precipitate, fourth: thoroughly washing the same with boiling water and fifth: drying the product at a suitable temperature.

In testimony that I claim the foregoing as my invention I have signed my name, in presence of two witnesses, this 11th day of June, 1895.

ARMAND MÜLLER-JACOBS.

Witnesses:
J. C. LEBRET,
O. BLOCK.